Patented Jan. 16, 1951

2,538,072

UNITED STATES PATENT OFFICE 2,538,072

EPOXIDE PREPARATION

John D. Zech, Anchorage, Ky., assignor to Devoe & Raynolds Company, Inc., Louisville, Ky., a corporation of New York No Drawing. Application June 11, 1947, Serial No. 754,080

4 Claims. (Cl. 260—348.6)

This invention has to do with the preparation of epoxides and epoxide compositions and, more particularly, relates to the preparation of such substances by dehydrohalogenation of halohydrins and halohydrin compositions.

For a clear understanding of the reactants, products and process of this invention, the following definitions are set forth. As used herein, the term "epoxide" denotes a compound characterized by the presence of at least one cyclic ether group, namely one wherein an ether oxygen atom is attached to two different carbon atoms thereby forming a cyclic structure. The term "epoxy" also describes the foregoing cyclic ether group. The language "epoxide compositions" and "epoxy compositions" also refers to compositions in which one or more epoxides are present. The epoxides present in such compositions may contain one or a plurality of expoxide or cyclic ether groups. Epoxides most advantageously produced in the process contemplated herein are those containing at least one ethylene oxide group, namely, one wherein an ether oxygen atom is attached to two adjacent carbon atoms thereby forming a cyclic structure.

The term "halohydrin" describes aliphatic, cycloaliphatic and aryl-substituted aliphatic compounds containing at least one halogen atom and at least one hydroxyl group, each of which is attached to a different carbon atom of said compound. Particularly valuable halohydrins, however, are those in which a halogen atom and a hydroxyl group are attached to adjacent carbon atoms; such halohydrins are converted herein to epoxides containing one or more ethylene oxide groups. The term "halohydrin" is used here, however, in a somewhat restricted sense, in that compounds of chlorine, bromine and/or iodine are included, and those containing only fluorine halogen are excluded. That is, fluohydrins containing only fluorine as a characterizing halogen atom, are excluded; however, ha'ohydrins containing chlorine, bromine and/or iodine, in addition to fluorine are contemplated herein. This limitation is imposed in view of the relative stability of the carbon-fluorine bond or, in other words, the relative lack of reactivity of fluorine in such compounds. "Halohydrin composition," or "halohydrin compositions," indicate a composition or compositions in which one or more of the aforesaid halohydrins are present.

"Dehydrohalogenation," as used herein, describes a process wherein at least one mol of a hydrogen halide is removed from a halohydrin to form an epoxide. As indicated in describing a halohydrin above, the hydrogen halide removed is predominantly a chloride, bromide or iodide.

Considerable prior art has been directed to the formation of epoxides from halohydrins by means of dehydrohalogenation of the latter. For example, early work involved reaction of a halohydrin, such as ethylene chlorhydrin, with sodium hydroxide, whereby ethylene oxide was formed. This early development, however, was characterized by low yields of the desired epoxide, inasmuch as water of reaction (from alkali and hydrogen halide) led to the formation of glycols. In addition to hydrolysis, excess alkali remaining in the reaction mixture induced polymerization of epoxides, thereby further reducing the yield of the desired product. The latter effect, polymerization, is particularly pronounced when hydroxy epoxides, such as glycidol, are formed from halohydrins, typified by glycerol monochlorhydrin. Various procedures or modifications have been resorted to in order to avoid the aforegoing shortcomings. One typical procedure (Patent No. 1,446,872) involves the use of anhydrous alkali. Another typical modification, of Patent No. 2,061,377, involves reaction of chlorhydrins with aqueous alkali, with reaction conditions of temperature and pressure so regulated that the epoxide product may be distilled continuously from the reaction mixture; with such continuous distillation, substantial accumulation of epoxide in the reaction mixture is obviated, thereby reducing hydrolysis and polymerization. It should be recognized here that the latter modification is only applicable to volatile epoxides. Still another modification, described in Patent No. 2,314,039, concerns the use of low reaction temperatures and avoidance of excess basic reacting material. Clearly, then, strong alkalies are not suitable reagents for preparing epoxy compounds, particularly non-volatile, water-soluble epoxides, in view of the tendency of such reagents to cause hydrolysis and polymerization of epoxy products.

Of prior art disclosures, those of Patent Nos. 2,061,377; 2,070,990; 2,224,849; 2,248,635 and 2,314,039 provide a review of epoxide preparation procedures. As described therein, a large number of alkaline materials may be used in preparing epoxides from halohydrins. Alkaline materials of these patents are broadly classified as "basic reacting metal salts of strong bases and weak acids." Many of the alkaline materials falling within the latter classification are relatively expensive and, therefore, of limited application. In general, however, such materials are undesirable for use in the form of aqueous solutions or suspensions, for reasons mentioned above. In particular, however, these materials are not satisfactory in non-aqueous media. For example, powdered sodium and potassium hydroxides, require low reaction temperatures to reduce their polymerization action, when suspended in non-aqueous liquids. Similarly, powdered lime, or $Ca(OH)_2$, is relatively slow in reacting with halohydrins in non-aqueous media, yet it exercises a pronounced polymerization effect on the epoxide product or products. Other basic reacting metal salts of strong bases and weak acids have been found to be ineffective in converting halohydrins to epoxides in non-aqueous media; illustrative of such materials are the carbonates and bicarbonates of sodium and potassium; borax; stannates and tungstates of sodium. Still other materials, ineffective in non-aqueous media, are the hydroxides of magnesium, zinc, lead, iron and aluminum, and the corresponding oxides.

In continuing the search for a highly satisfactory dehydrogenation process for the preparation of epoxides from halohydrins, it has now been discovered, quite unexpectedly, that certain aluminates, silicates and zincates are outstanding when used in substantially, or completely, non-aqueous media. In such a medium, these new and unique dehydrohalogenating materials effectively remove hydrogen halides from halohydrins and, yet, have little or no tendency to induce polymerization or hydrolysis of the epoxide products so formed. These dehydrohalogenating materials are particularly advantageous when used to prepare readily polymerizable epoxides, non-volatile or relatively non-volatile epoxides, water-soluble epoxides, and epoxides containing readily hydrolyzable groups such as halogen, ester, etc. In view of the numerous alkaline materials hitherto disclosed as dehydrohalogenating agents for preparing epoxides, and in view of their aforesaid shortcomings of inducing hydrolysis and/or polymerization of epoxides, it is surprising that this new class of dehydrohalogenating agents is so effective.

DEHYDROHALOGENATING MATERIALS

The dehydrohalogenating materials for the process contemplated herein are basic-reactive metal aluminates, silicates and zincates, of which the alkali metal and particularly, sodium and potassium, compositions are preferred. Representative of such materials are the following:

A. Aluminates of alkali metals, such as $Na_3AlO_3$, $Na_2Al_2O_4$, $Na_2Al_2O_4 \cdot xH_2O$ (where $x$ represents the quantity of associated water), $K_2Al_2O_4$.

B. Zincates of alkali metals, principally sodium and potassium.

C. Silicates of alkali metals, either anhydrous or hydrated orthosilicates, metasilicates, disilicates, trisilicates, sesquisilicates, etc. Typical of such materials are $Na_2SiO_3 \cdot 5H_2O$, $3Na_2O \cdot 2SiO_2 \cdot 11H_2O$, $Na_4SiO_4$ and $Na_2SiO_3$.

HALOHYDRINS

As indicated hereinabove, the halohydrins of this invention are aliphatic, cycloaliphatic and aryl-substituted aliphatic compounds containing at least one halogen atom and at least one hydroxyl group, each of which is attached to a different carbon atom thereof. Preferred, however, are those in which the halogen and hydroxyl are attached to adjacent carbon atoms. It will be clear that the simplest of such compounds is an ethylene halohydrin, such as ethylene chlorhydrin. Other typical halohydrins are glycerol mono- and di-chlorhydrins; propylene bromhydrin; bis (3-chloro-2-hydroxy propyl) ether; 1,4-dichloro-2,3-dihydroxy butane; 1,4-dihydroxy-2,3-dichloro butane; 9-chloro-1,10-dihydroxy octadecane; 1-chloro-2-hydroxy cyclohexane; 1,4-dichloro-2,3-dihydroxy cyclohexane; 1-chloro-2-hydroxy-2-phenyl ethane; 1-hydroxy-2-chloro-2-phenyl ethane; 1-bromo-2-hydroxy-2-phenyl ethane; 1-iodo-2-hydroxy-2-phenyl ethane; dihalohydrins derived from divinyl benzenes, for example, by the addition thereto of two mols of hypohalous acids; etc.

By way of illustration, a simple halohydrin such as ethylene chlorhydrin will be converted to ethylene oxide when treated with one of the foregoing aluminates, silicates or zincates, viz:

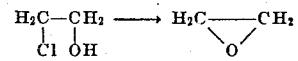

Similarly, glycidol is prepared from glycerol monochlorhydrin, and epichlorhydrin from glycerol dichlorhydrin:

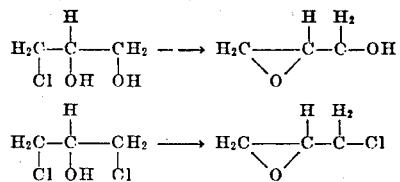

When a halogen atom and a hydroxy group are attached to different carbon atoms which, in turn, are attached to an intervening carbon atom of an aliphatic compound, an homologous epoxide is formed. This may be illustrated by the conversion of a 1-chloro-3-hydroxy-butane to the corresponding epoxide:

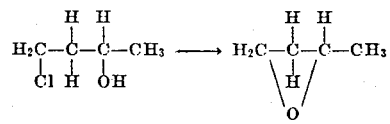

The foregoing illustrative reactants may be characterized as simple halohydrins, as opposed to those of a more complex nature. The latter are referred to herein as "complex halohydrins" and are obtained by reaction of an epihalohydrin with a polyhydric compound, such as a polyhydric phenol or a polyhydric alcohol or mixture thereof, in the presence of a suitable condensing agent. The complex halohydrins are advantageously converted to epoxides and epoxide compositions by the aforesaid dehydrohalogenation treatment, and represent a preferred class of halohydrins.

An epihalohydrin and a polyhydric alcohol or polyhydric phenol, or mixture thereof, are reacted in the presence of a suitable catalyst, whereupon a halohydrin or mixture of halohydrins is formed. Polyhydric alcohols and polyhydric phenols which may be used for the preparation of the complex halohydrins are illustrated by the following:

(a) Polyhydric alcohols
   Ethylene glycol
   Propylene glycol
   Diethylene glycol
   Trimethylene glycol
   2,3-butanediol
   1,4-dihydroxy-2-butene
   1,12-dihydroxy octadecane
   1,4-dihydroxy cyclohexane
   2,2-dimethyl-1,3-propanediol 2-ethyl-2-butyl propanediol-1,3
Glycerol
Erythritol
Sorbitol
Mannitol
Inositol
Trimethylol propane
Pentaerythritol
Polyallyl alcohol
Bis (4-hydroxycyclohexyl) dimethyl methane
1,4-dimethylol benzene
4,4'-dimethylol diphenyl
Dimethylol xylenes
Dimethylol naphthalenes, etc.
(b) Polyhydric ether alcohols
Diglycerol
Triglycerol
Dipentaerythritol
Tripentaerythritol
Dimethylolanisoles
Beta hydroxyethyl ethers of polyhydric alcohols and phenols, such as
  Diethylene glycol
  Polyethylene glycols
Bis(beta hydroxyethyl ether) of hydroquinone
Bis(beta hydroxyethyl ether) of bisphenol
Betahydroxyethyl ethers of glycerol, pentaerythritol, sorbitol, mannitol, etc.
Condensates of alkylene oxides such as ethylene oxide, propylene oxide; butylene oxide, isobutylene oxide, glycidol, epichlorhydrin, glycid ethers, etc. with polyhydric alcohols such as the foregoing and with polyhydric thioether alcohols such as
  2,2'-dihydroxy diethyl sulfide
  2,2',3,3'-tetrahydroxy dipropyl sulfide
  2,2',3 - trihydroxy-3'-chlordipropyl sulfide, etc.
(c) Hydroxy-aldehydes and -ketones
  Dextrose
  Fructose
  Maltose
  Glyceraldehyde
(d) Mercapto (thiol) alcohols
  2-mercapto ethanol
  Alpha monothioglycerol
(e) Polyhydric phenols
  Hydroquinone
  Resorcinol
  Phloroglucinol
  Pyrogallol
  Bisphenol (predominantly 4,4'-dihydroxy diphenyl dimethyl methane)
  Dihydroxy diaryl sulfones
(f) Hydroxy esters
  Monoglycerides, such as monostearin
  Ethylene glycol dilactate
  Mono esters of pentaerythritol, e. g. a monoacetate
(g) Halogenated alcohols (halohydrins)
  Glycerol monochlorhydrins
  1,4-dichloro-2,3-hydroxy butane
  Monochloride of pentaerythritol Epihalohydrins used in preparing the aforesaid complex halohydrins include epichlorhydrin, epibromhydrin and epiiodohydrin. The latter materials are all characterized by a three-carbon chain; however, analogs of the aforesaid epihalohydrins may also be used. Examples of the latter are beta- and gamma-methyl epichlorhydrins; 1,4-dichloro-2,3-epoxy butane; etc. It will be noted that epifluorhydrin and its analogs are not referred to above. Inasmuch as fluorine is rather unreactive in such epoxy compounds, the latter are not contemplated herein. Accordingly, the term "epihalohydrin" as used in connection with the preparation of complex halohydrins, throughout the specification and appended claims, defines compounds in which the halogen is chlorine, bromine and iodine, and is exclusive of fluorine. In view of its availability and relatively low cost, epichlorhydrin is preferred.

Other suitable compounds which may be reacted with epihalohydrins to form complex halohydrins which, in turn, may be dehydrohalogenated to valuable epoxide compositions, include hydrogen sulfide, mono- and poly-mercaptans, such as amyl mercaptan, dodecylmercaptan, trithioglycerol, ethylene dimercaptan, p-xylylene dimercaptan, thioglycolic esters of polyhydric alcohols, etc. Also hydroxyepoxides, in place of epihalohydrins, may be reacted with suitable halogen-containing compounds to form complex halohydrins, the latter providing valuable epoxides when dehydrohalogenated with one or more of the aforesaid aluminates, silicates or zincates. Typical of such hydroxyepoxides is glycidol. Representing the halogen-containing compounds are organic acid halides, both mono and polybasic, such as benzoyl chloride, phthalyl dichloride, acetyl chloride, etc.; the inorganic acid halides, such as $PCl_3$, $POCl_3$, $SiCl_4$ $SOCl_2$, $SCl_2$, etc.; diethyl dichlorsilane, ethyl dichlorosilane; etc.

As aforesaid, condensing catalysts are used in reacting an epihalohydrin with a polyhydric alcohol or polyhydric phenol, for the formation of a halohydrin or halohydrin-containing composition. Typical catalysts are those of the Friedel-Crafts type, including anhydrous $AlCl_3$, $BF_3$, $ZnCl_2$, $FeCl_3$, $SnCl_4$, and complexes such as the well known $BF_3$ etherates, etc.; acid type catalysts including HF, $H_2SO_4$, $H_3PO_4$, etc.; others such as $SbCl_5$; etc. Concentration of catalysts may be varied, depending upon the individual catalyst. For example, from about 0.1% to about 0.2% or $BF_3$ or a complex thereof, based upon the total quantity of reactants, provide satisfactory results. When greater concentrations of such catalysts are used, the resulting halohydrin compositions are generally darker in color. In general then, the converting catalyst is used in small concentration, up to about 5% but generally less than 1% of the total reactants.

The complex halohydrins are advantageously formed by reacting the epihalohydrin and polyhydric alcohol or polyhydric phenol, in the presence of a suitable condensing catalyst, at a temperature between about 25° C. and about 175° C. In general, temperatures above about 130° C. cause some darkening in color of the halohydrin composition, but may be advantageously used when very light color is no object. For example, the temperatures of the order of 130–175° C. are advantageous with high melting polyhydric alcohols, such as mannitol, pentaerythritol, polypentaerythritols, etc. Further, temperatures of the order of 25° C. generally provide a slow reaction rate, unless relatively large concentrations of catalyst are used. Most satisfactory results, that is, proper rate of reaction and light color of product, are obtained with temperatures in the neighborhood of 75–125° C.

The condensation of an epihalohydrin and a polyhydroxy compound may be carried out in any one of several ways. For example, the two reactants may be mixed at room temperature and the catalyst may be added thereto. Condensation is relatively slow initially, becoming more rapid as the temperature rises due to the liberation of heat. Generally, the temperature rises appreciably so that efficient cooling must be applied to prevent violent reaction. A preferred method involves adding the catalyst to the hydroxy compound and then adding the epihalohydrin thereto gradually at a temperature of about 50-125° C. This provides a more uniform product and greater control over the reaction. Inasmuch as the reaction is exothermic, cooling can be applied to shorten the time required for the addition of the epihalohydrin. By proper adjustment of the rate of cooling and rate of addition of the epihalohydrin, the reaction can be carried out at the desired temperature in a minimum period of time.

In carrying out the reaction of the polyhydroxy compound and the epihalohydrin, it is advantageous to use a solvent with certain high melting, relatively insoluble alcohols. By way of illustration, pentaerythritol and polypentaerythritols are difficultly soluble and high melting. Polyhydric alcohols, such as ethylene glycol, glycerol, diglycerol and trimethylol propane are the most satisfactory solvents for the pentaerythritols, when the latter are condensed with epihalohydrins. Naturally these solvents, as polyhydroxy compounds, also condense with the epihalohydrins; as a result, an extremely complex halohydrin composition is formed, rather than a relatively simple, pentaerythritol-epihalohydrin condensate.

As indicated hereinabove, the dehydrohalogenation treatment is affected in a non-aqueous, or substantially non-aqueous medium. Organic solvents or diluents which may be used, and which are substantially unreactive in this treatment, include: hydrocarbons such as benzene, toluene, etc.; ketones such as acetone, methyl ethyl ketone, etc.; ethers typified by diethyl ether, methylal, dichlorethyl ether (chlorex), 1.3-dioxolane and dioxane; halides such as ethylene dichloride, carbon tetrachloride, etc. Of such solvents, dioxane is particularly satisfactory, and is preferred. In general, organic solvents which are infinitely miscible with water appear to facilitate filtration, especially when sodium zincate is used as the dehydrohalogenating agent. With ketones, such as acetone, a small amount of aldol type condensation may occur, particularly with sodium zincate or sodium orthosilicate, leading to the formation of diacetone alcohol and/or mesityl oxide; this in no way effects the yield of epoxide.

In the formation of the complex halohydrins, it is possible to vary the proportions of epihalohydrin and polyhydroxy compound over a considerable range. The halohydrins formed therefrom and, in turn, the epoxides derived from said halohydrins, are of somewhat varied character depending on proportions of epihalohydrin and polyhydroxy compound. In addition to epoxy groups, the epoxide compositions so formed are characterized by the presence of hydroxyl groups and halogen. For example, a substantially colorless epoxide composition averaging about 2.1 epoxide groups per molecule is obtained when about three mols of epichlorhydrin are condensed with one mol of glycerol in the presence of BF$_3$, and the very viscous, substantially colorless halohydrin composition so formed is treated with one or more of the aforesaid aluminates, silicates or zincates. An epoxide composition characterized by a relatively large number of hydroxyl groups may be prepared in a similar manner, but with the ratio of epichlorhydrin to hydroxyl group of less than 1, such as about two mols of epichlorhydrin per mol of glycerol. The latter epoxy products are rather sensitive to polymerization (reassembling glycidol in this characteristic), more so than the corresponding epoxy products obtained by using an epichlorhydrin to hydroxyl group ratio of 1 or greater than 1. Similarly, if it is desired to minimize the halogen content of the epoxy products, ratios of epichlorhydrin to hydroxyl group of less than 1 are used. In general, however, desirable complex halohydrin compositions for use herein are obtained with from about 0.5 mol to about 2 mols of epihalohydrin for each hydroxyl group of the polyhydric alcohol or polyhydric phenol. Particularly preferred are those obtained when about one mol of an epihalohydrin is used for each hydroxyl group of the polyhydroxy compound.

DEHYDROHALOGENATION

As indicated hereinabove, the dehydrohalogenating reagents of this invention are basic reacting aluminates, silicates and zincates. These reagents are illustrated above and, in general, the sodium salts thereof are preferred. The conditions required for satisfactory conversion of halohydrin to epoxide varies somewhat with these reagents. When sodium aluminate is used, it is preferred to carry out the reaction at temperatures of the order of 70-105° C., although satisfactory results are obtained with temperatures from about —25° C. to about 125° C., depending upon the reactivity of the halohydrin. With temperatures below about 70° C. the reaction time is relatively long. With temperatures within the preferred range of 70-105° C., reaction is usually complete with 1-3 hours with quantities of reactants such as shown in the following illustrative examples. The quantity of sodium aluminate used with the halohydrin may be varied considerably. A quantity containing a slight excess is generally desirable; that is, the quantity of sodium aluminate used is such that the sodium content is slightly in excess of the halogen content of the halohydrin reactant. Even a large excess of sodium aluminate may be used without decreasing the yield of epoxide product, thus illustrating the absence of a polymerization effect. It has been further discovered that particularly outstanding results are realized when a small amount of water is used with sodium aluminate in the reaction. The quantity of water used is preferably of the order of about 1% to about 15% of the quantity of sodium aluminate, but as much as about 30% of water may be used with a large quantity of a water-miscible organic diluent. If substantially larger quantities of water are used, the yield of epoxide product is decreased, perhaps, by hydrolysis and/or polymerization of the product. Outstanding are sodium and potassium aluminates.

With regard to zincate reactants, the sodium salts are again preferred in view of their availability and excellent characteristics. These salts appear to be more reactive than the corresponding aluminates. Thus, somewhat lower temperatures and shorter reaction periods may be used. In general, a reaction period of ½ hour to 1 hour at 70° C., with quantities of reactants such as shown in the following typical examples, provides excellent conversion of halohydrin to epoxide. Reaction temperature may be advantageously varied, however, from about −25° C. to about 125° C., with reaction periods varying from about ½ hour to about 10 hours. The quantity of zincate used with simple halohydrins, such as ethylene chlorhydrin, is preferably substantially equivalent to that theoretically required for the halohydrin reactant; again, this is based upon the quantity of alkali metal, as sodium, required to react with the halogen of the halohydrin reactant. With complex halohydrins prepared by reaction of from about ½ to about 1 mol of epihalohydrin per hydroxyl group of the polyhydric alcohol, the quantity of zincate used preferably varies from about an equivalent quantity to about ⅔ of an equivalent; an equivalent quantity of zincate is one containing a quantity of alkali metal, e. g. sodium, equivalent to the halogen content of the halohydrin. When the ratio of epichlorhydrin to hydroxyl group of the polyhydric alcohol is greater than one, the quantity of zincate is preferably from about ¾ to about ⅓ of an equivalent. If less than an equivalent of zincate is used, the epoxide or epoxide composition formed contains halogen, the halogen being relatively unreactive. To illustrate this relationship, the reaction of three mols of epichlorhydrin with one mol of ethylene glycol provides a mixture of chlorhydrin products, some of which are relatively simple in character and others of which are relatively complex. One such complex chlorhydrin which is most probably present, and which contains some relatively unreactive chlorine in addition to some reactive chlorine, is the following:

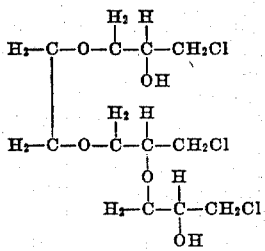

With such a complex chlorhydrin, the quantity of sodium zincate used should preferably be equivalent to about ⅔ of the chlorine present therein, and the epoxide formed therefrom would contain chlorine.

Particularly preferred of the zincates, is a sodium zincate having a zinc oxide content of about 30%.

The silicates listed above are illustrative of a relatively large number which may be used herein. Generally, the reaction conditions are substantially the same as those resorted to when the aluminates and/or zincates are involved. That is, reaction temperatures from about −25° C. to about 125° C., and reaction periods of from about ½ hour to about 10 hours are satisfactory; preferred, however, are temperatures of the order of 50 to 105° C. and reaction periods of ½ to 3 hours. The very highly alkaline silicates, such as anhydrous sodium orthosilicate, when finely powdered are quite similar in behavior to sodium zincate; such silicates are preferably used in substantially theoretical quantities with the halohydrin reactants, as described above in connection with zincate reactants. In order to realize the maximum benefit of the alkali metal content of the anhydrous silicates, they should be finely powdered before use. This may be suitably accomplished by known methods, such as grinding in a ball mill, rolling mill, etc. Typical silicates which provide better results when finely powdered are anhydrous sodium meta-, seque-, and orthosilicates; such materials are extremely hard and glass-like. Particular preference is given herein to the following silicates: anhydrous sodium ortho silicate; hydrated sodium meta and sesqui silicates.

Several relationships influence the efficacy of the dehydrohalogenating reagents. Among these are particle size and surface area; and amphoteric metal oxide content, such as $Al_2O_3$, $SiO_2$, $ZnO$. As previously indicated, the extremely hard, glass-like anhydrous silicates are more effective when finely powdered. Most effective use of these materials is realized when the particle size is low as of the order of 60 mesh or finer. This relationship is of less import with hydrated silicates, aluminates and zincates, which generally disintegrate or disperse readily in the halohydrin-solvent mixture. Even with the latter salts, however, it is preferred that the particle size be relatively small, and of the character noted in connection with the finely powdered silicates.

In the dehydrohalogenation reaction, the halohydrin or halohydrin composition and the aluminate, silicate and/or zincate are brought together in the proportions indicated above. Reaction may be carried out at temperatures from about −25° C. to about 125° C. The preferred temperatures, however, are indicated above in the discussion of the various aluminates, silicates and zincates. When hydroxy-epoxides, such as glycidol, are prepared from halohydrins, low temperatures are used to advantage, in view of the unusual sensitivity of such epoxides to polymerize; recommended temperatures here are of the order of −25° C. to 0° C. The dehydrohalogenation reagent and the halohydrin react with the formation of an alkali halide. Presumably, the alkali metal of the aluminate, for example, reacts with the halogen acid removed from the halohydrin, with the formation of an alkali metal halide. Apparently, no aluminum halide is formed in the reaction; however, $Al(OH)_3$ and/or $Al_2O_3$ is formed. At the end of the reaction period, the reaction mixture is filtered through a suitable filter medium, e. g. diatomaceous earth, to remove alkali metal halide, alumina, hydrated alumina and excess aluminate. The filter cake so formed is washed with solvent to remove traces of product entrained therein. The solvent is then recovered by distillation as the distillate, leaving the epoxide product as a residue in the case of a non-volatile epoxide composition. When the epoxide composition is volatile, it may be obtained as a fraction of the total distillate. It is generally desirable to remove the solvent by vacuum distillation in order to avoid heating the epoxide products to high temperatures. This is particularly advantageous in the preparation of hydroxyepoxide compositions, such as are derived from the condensates of epichlorhydrin with a polyhydric alcohol in which less than one mol of epichlorhydrin is used per hydroxyl group of a polyhydric alcohol; an illustration of such products is one derived from two mols of epichlorhydrin with one mol of glycerol, that is, one derived from ⅔ mol of epichlorhydrin per hydroxyl group. As mentioned above, such hydroxy-epoxides are much more sensitive toward polymerization than are the corresponding hydroxyepoxides derived from the condensates of one or more moles of epichlorhydrin per hydroxyl group of a polyhydric alcohol.

When sodium zincate is used in the dehydrohalogenation treatment, sodium chloride and ZnO or Zn(OH)₂ are formed. These by-products, and any excess zincate, are removed from the reaction by filtration as when an aluminate is used. The zinc oxide may be recovered from the filter cake and reconverted to a zincate by known procedure, so also may alumina be reconverted to an aluminate. Sodium zincate is somewhat more advantageous than the corresponding aluminate, in that it is somewhat more reactive. As indicated above, lower reaction temperatures and shorter reaction periods may be used; so also, less zincate is required for a given conversion of halohydrin to epoxide. As a result, a smaller filter cake is obtained; also less solvent is required for washing the filter cake. In addition, smaller filter press is required.

When a sodium silicate is used, sodium chloride and SiO₂ and/or its hydrates are formed. As with treatment with an aluminate and/or zincate, these by-products may be removed by filtration. Certain silicates are particularly convenient for use in dehydrohalogenating treatment, inasmuch as they are converted therein to a stiff paste which clings to the sides of the reaction vessel in which the treatment is effected. At the end of the reaction treatment, filtration is unnecessary; the solution of epoxide product may be simply poured from the reaction vessel, or may be siphoned therefrom. Hydrated silicates are so characterized.

In effecting the dehydrohalogenation treatment, super and sub-atmospheric pressures may be used. For example, when a low boiling solvent, such as diethyl ether, is involved superatmospheric pressure is advantageous. Similarly, when a volatile epoxide, such as ethylene oxide, is formed, sub-atmospheric pressure is desirable. Also, the treatment may be carried out in a batch or a continuous operation.

ILLUSTRATIVE EXAMPLES

The following examples are provided to illustrate the invention, and are not to be construed as limitations thereof. The examples illustrate the individual materials which may be used in the process contemplated herein and also illustrate the products obtained by such process. In each of the following examples, unless otherwise indicated, the viscosities are those of the Gardner-Holdt scale, and average molecular weights are those obtained by standard freezing point depression method with benzophenone.

*Example I*

In a three-liter, three-neck glass reaction flask, equipped with a thermometer, dropping funnel and an electrically-driven stirrer, were placed 552 grams (6 mols) of glycerol and 5 ccs. of an ethyl ether solution of $BF_3$ (45% $BF_3$). The mixture was agitated and heated to 65° C., whereupon heating was discontinued. Epichlorhydrin was then added gradually through the dropping funnel to the mixture, at such a rate that the temperature varied from 70–90° C., with external cooling being applied to the flask. The epichlorhydrin, 1665 grams (18 mols) was added during a period of 1 hour and 49 minutes. The reaction mixture was stirred for another hour, without further cooling; during this period the temperature was 60–87° C. The substantially colorless liquid product so obtained had a viscosity of Z₄.

A portion of the aforesaid product, 370 grams, and 900 ccs. of dioxane were placed in a three-liter, three-neck glass flask fitted with a thermometer, reflux condenser and an electrically-driven stirrer. The dioxane solution was stirred and three hundred grams of sodium aluminate ($Na_2Al_2O_4$) were added thereto. The resulting mixture was then refluxed at 93° C. for 8¾ hours. The mixture was then cooled and filtered through diatomaceous earth on a Buchner funnel. The filter cake thus formed was washed with dioxane. The filtrate and dioxane washings were combined and vacuum distilled to a maximum temperature of 205° C. at 20 mms., whereupon dioxane was removed as the distillate. The product, 261 grams, was a pale-yellow liquid having a viscosity of D; a chlorine content of 9.1 per cent; an average molecular weight of 324; and an epoxide equivalent of 149, thus having an average of about 2.2 epoxide groups per molecule.

The epoxide group content of the epoxide product was determined by heating a sample of the epoxide composition with an excess of pyridine containing pyridine hydrochloride, at the boiling point for 20 minutes, and back titrating the excess pyridine hydrochloride with 0.1 normal sodium hydroxide, using phenolphthalein as indicator. One HCl is considered equivalent to one epoxide group. The pyridine-pyridine hydrochloride solution is made by adding 16 ccs. of concentrated hydrochloric acid per liter of pyridine.

*Example II*

A quantity, 187 grams, of the glycerol-epichlorhydrin condensate described in Example I above, 164 grams of sodium aluminate and 400 ccs. of dry diethyl ether, were placed in a one-liter, three-neck glass flask fitted with a thermometer, a reflux condenser and an electrically-driven stirrer. The mixture so formed was agitated at 25–34° C. for four days. Most of the ether had evaporated at the end of the four day period, whereupon the reaction mixture was diluted with additional diethyl ether and filtered. The filtrate was distilled, thereby removing diethyl ether. The liquid product, 89 grams, thus obtained was substantially colorless, had an epoxide equivalent of 146 and contained about 9.1 per cent chlorine.

*Example III*

In contrast to the effectiveness of sodium aluminate in Examples I and II above, and various silicates and zincates in the following examples, is the undesirable nature of sodium hydroxide as a dehydrohalogenating agent, viz.:

A quantity, 187 grams, of the glycerol-epichlorhydrin condensate described in Example I above, and 300 ccs. of dry diethyl ether were placed in a one-liter, three-neck glass flask equipped with a thermometer, a reflux condenser and an electrically-driven stirrer. The flask was cooled in salt-ice bath. At a temperature of −2 to −5° C., the ether solution was agitated and 80 grams of powdered sodium hydroxide were added thereto during a period of 67 minutes. The resulting mixture was then stirred for three hours, the temperature rising to 19° C. at the end of this period. The ether solution was decanted from the flask and ether distilled therefrom. The product, a colorless liquid product, had an epoxide equivalent of 126 and a chlorine content of about 7.8 per cent. Only 30 grams of the product were obtained; this corresponds to about 21 per cent of the theoretical yield. This is in contrast to yields of about 64 per cent in Example II and about 93 per cent in Example I.

Similar results, with low yield of product and/or low epoxide content of product, have been obtained with a large number of alkaline materials disclosed in the prior art referred to hereinabove.

*Example IV*

A quantity, 186 grams, of the glycerol-epichlorhydrin condensate described in Example I above, 20 grams of water and 300 ccs. of dioxane were placed in a one-liter, three-neck glass flask equipped with a thermometer, a reflux condenser and an electrically-driven stirrer. The dioxane solution so formed was agitated and 80 grams of finely powdered anhydrous sodium ortho silicate ($Na_4SiO_4$; 60 mesh) were added thereto. The resulting mixture was refluxed at 93° C. for ½ hour. The mixture was then cooled and filtered as described above in Example I. The filtrate and dioxane washings were combined and vacuum distilled. The product, 139 grams, had an epoxide equivalent of 139; a molecular weight of 295, thus corresponding to an average of 2.1 epoxide groups per molecule; a viscosity of D+; and a chlorine content of 6.4 per cent.

*Example V*

A quantity, 186 grams, of an epichlorhydrin-glycerol condensate prepared as described in Example I above, 230 grams of sodium metasilicate pentahydrate ($Na_2SiO_3.5H_2O$) and 300 ccs. of dioxane were placed in a flask such as described in Example II above. The resulting solution was stirred and refluxed at 91° C. for 3 hours. A paste, presumably a mixture of silica gel and sodium chloride, was formed and stuck to the wall of the flask and the stirrer. The solution was poured from the flask and vacuum distilled. The product, 150 grams, had an epoxide equivalent of 150.

*Example VI*

An epichlorhydrin-glycerol condensate, 186 grams, prepared as described in Example I above was dissolved in 300 ccs. of dioxane and treated with 145 grams of a hydrated sodium sesquisilicate ($3Na_2O.2SiO_2.11H_2O$), in the manner described in Examples IV-V above. The reaction mixture was refluxed at 92° C. for 3 hours. As in Example V, a paste formed on the flask and stirrer. The liquid mixture was poured from the flask and vacuum distilled. The product, 139 grams, had an epoxide equivalent of 148; a viscosity of E; and a chlorine content of 9.6.

*Example VII*

An epichlorhydrin-glycerol condensate, 186 grams, prepared as described in Example I above was dissolved in 300 ccs. of dioxane and treated with 90 grams of sodium zincate (30% ZnO), in the manner described in Examples IV-VI above. The reaction mixture was heated at 70° C. for ½ hour, then cooled and filtered as described in Example I. The filtrate and dioxane washings were combined and vacuum distilled. The product, 134 grams, had an epoxide equivalent of 143; a viscosity of D; and a chlorine content of 8.9 per cent.

*Example VIII*

Glycerol and epichlorhydrin, in a molar ratio of 1:2, were condensed in the manner described in Example I above. A quantity, 417 grams, of the condensate, was dissolved in 400 ccs. of dioxane and was treated with 180 grams of sodium zincate (30% ZnO), as described in Example VII above. The dioxane solution thus formed was heated at 65–70° C. for 1½ hours, then cooled, filtered and the filtrate vacuum distilled. The liquid product, 305 grams, had an epoxide equivalent of 167; a viscosity of M; and a chlorine content of 2.2 per cent.

*Example IX*

Glycerol and epichlorhydrin, in a molar ratio of 1 to 4, were condensed in the manner described in Example I above. A quantity, 231 grams, of the condensate was dissolved in 300 ccs. of dioxane and was treated with 190 grams of sodium aluminate ($Na_2Al_2O_4$), as described in Example II. The dioxane solution thus formed was refluxed at 97° C. for 3 hours, then cooled, filtered and vacuum distilled. The liquid product, 168 grams, had an epoxide equivalent of 144; a viscosity of F; and a chlorine content of 10.8 per cent.

*Example X*

One mol of trimethylol propane and three mols of epichlorhydrin were condensed in the manner described in Example I. The reaction temperature was 32–69° C. and the total reaction time was 5 hours.

The condensate, 415 grams, was dissolved in 600 ccs. of dioxane and treated with 275 grams of sodium aluminate ($Na_2Al_2O_4$), in the manner described in the preceding examples with $Na_2Al_2O_4$. The product—299 grams—obtained, after vacuum distillation to 200° C. at 20 mms., was a pale yellow liquid having an epoxide equivalent of 151 and an average molecular weight of 292, indicating an average of 1.9 epoxide groups per molecule.

*Example XI*

Glycerol monochlorhydrin (1105 grams; 10 mols) and epichlorhydrin (925 grams; 10 mols) were condensed in the presence of 1 cc. of an ethyl ether solution of $BF_3$ (45% $BF_3$), in the manner indicated in Example I above. The reaction temperature varied from 21–106° C., during a period of 1¼ hours. The condensate so obtained was vacuum distilled to 200° C. at 3 mms., providing a large fraction distilling at 143–200° C. at 3 mms.

A quantity, 603 grams, of the distillate was dissolved in 900 ccs. of dioxane and treated with 546 grams of sodium aluminate at 94° C. for 2¼ hours, as described in preceding examples. The reaction product so obtained was vacuum distilled, after solvent (dioxane) had been removed, into the following fractions:

| Fraction | Quantity | Boiling Point |
|---|---|---|
| | Grams | |
| 1 | 195 | 122–126° C./34–43 mms. |
| 2 | 95 | 143–170° C./4 mms. |
| 3 | 80 | residue. |

Fraction 1 had an epoxide equivalent of 69.5 and was predominantly diglycid ether. Fraction 2 had an epoxide equivalent of 214. The residue had an epoxide equivalent of 371 and an average molecular weight of 325, indicating an average of 0.9 epoxide group per molecule.

*Example XII*

Epichlorhydrin (595 grams; 6.5 mols) and 2-ethyl-2-butyl-1,3-propanediol (516 grams; 3.3 mols) were condensed in the manner indicated in Example I. The condensate, 1111 grams, was treated with sodium aluminate, 1050 grams, in 1000 ccs. of dioxane and 25 ccs. of water, at 100° C. for 3 hours. The reaction mixture so obtained was treated in the manner described in the preceding examples wherein sodium aluminate was used. The liquid product, 736 grams, so obtained had an epoxide equivalent of 198 and a chlorine content of 15.7 per cent.

*Example XIII*

Epichlorhydrin (185 grams, 2 mols) and 1,12-dihydroxy-octadecane (diolin; 286 grams, 1 mol) were condensed in the manner described in Example I above, the reaction temperature and reaction time being 41-69° C. and 3 hours, respectively. The condensate so formed—475 grams—was treated with 185 grams of sodium aluminate in 600 ccs. of dioxane, at 96° C. for 3 hours. The reaction mixture which formed was treated as described in preceding examples involving sodium aluminate. A colorless liquid, 412 grams, was obtained; it had an epoxide equivalent of 485.

*Example XIV*

Epichlorhydrin (303 grams; 3.3 mols) and erythritol (100 grams; 0.84 mol) were condensed at 90-143° C. for 1 hour in the manner described in Example I above. The condensate, 403 grams, was treated with 500 grams of sodium zincate (30% ZnO) in 500 ccs. of dioxane and 10 ccs. of water. The reaction temperature was 90-98° C. and the reaction time was 3 hours. The reaction mixture thus obtained was treated as described in Example VIII above. The liquid product, 217 grams, had a chlorine content of 10.1 per cent and an epoxide equivalent of 185.

*Example XV*

Epichlorhydrin (463 grams; 5 mols) and triglycerol (240 grams; 1 mol) were condensed in the manner described in Example I, with the temperature 92-130° C. for 2¼ hours. A quantity, 235 grams, of the condensate was treated with 170 grams of sodium zincate (30% ZnO) in 500 ccs. of dioxane and 20 ccs. of water, at 96° C. for 3 hours. The product, obtained as described in Example VII above, weighed 164 grams. The product had an epoxide equivalent of 164 and an average molecular weight of 421, representing an average of 2.6 epoxide groups per molecule; it also had a chlorine content of 8.5 per cent and a viscosity of U.

*Example XVI*

Epichlorhydrin (555 grams, 6 mols) and polyallyl alcohol (400 grams) were condensed at 90-95° C. for five hours, according to the procedure described in Example I above. The condensate, 955 grams, was treated with 540 grams of sodium zincate (30% ZnO) in 1000 ccs. of dioxane, at 97° C. for three hours. The reaction mixture so obtained was treated as described in Example VII above. The liquid product, 568 grams, isolated from said reaction mixture, had an epoxide equivalent of 221 and an average molecular weight of 540, representing an average of 2.4 epoxide groups per molecule.

*Example XVII*

Epichlorhydrin (491 grams, 5.3 mols) was condensed with dextrose (138 grams, 0.7 mol) and ethylene glycol (46 grams, 0.7 mol) at 100-136° C. for 1⅔ hours, according to the procedure described in Example I above. The condensate, 629 grams, was reacted with 925 grams of sodium zincate in 600 ccs. of dioxane and 15 ccs. of water, at 96° C. for three hours. The reaction mixture was treated in the manner described in Example VII above. The liquid product, 317 grams, had an epoxide equivalent of 268 and contained 10.2 chlorine.

*Example XVIII*

Epichlorhydrin (648 grams, 7 mols) was condensed with sorbitol (182 grams, 1 mol) at 91-108° C. for 2½ hours, in the manner described in Example I. A quantity, 208 grams, of the condensate so obtained was treated with 105 grams of sodium zincate in 500 ccs. of dioxane, at 70° for ½ hour. The reaction mixture thus formed was treated in the manner described in Example VII above. The liquid product, 150 grams, had an epoxide equivalent of 216 and an average molecular weight of 679, representing an average of 3.1 epoxide groups per molecule. The chlorine content of the product was 10.2.

*Example XIX*

Epichlorhydrin (278 grams, 3 mols) was condensed with sorbitol (182 grams, 1 mol) at 103-114° C. for 1¼ hours as described in Example I above. A portion, 231, of the condensate was reacted with 164 grams of sodium aluminate in 300 ccs. dioxane and 15 ccs. of water, at 95° C. for three hours. The reaction mixture was treated in the manner described in Example I above, and the liquid products obtained had an epoxide equivalent of 202. The liquid product contained 9.3% chlorine.

*Example XX*

Epichlorhydrin (555 grams, 6 mols) was condensed with sorbitol (182 grams, 1 mol) at 90-109° C. for three hours, as described in Example I above. The quantity, 213 grams, of the condensate was treated with 175 grams of sodium aluminate, 400 ccs. dioxane and 15 ccs. of water, at 96° C. for 1¼ hours. The reaction mixture was treated in the manner described in Example I above. The liquid product, 147 grams, so obtained had an epoxide equivalent of 214 and an average molecular weight of 576 indicating an average of 2.7 epoxide groups per molecule.

*Example XXI*

Epichlorhydrin (1110 grams, 12 mols) was condensed with pentaerythritol (317 grams) and trimethylol propane (134 grams, 0.8 mol) at 134-153° C. for 2¼ hours. The pentaerythritol used was a technical grade comprising a mixture of approximately 50% dipentaerythritol and 50% pentaerythritol and related compounds. The reaction mixture thus formed was treated in the manner described in Example I above. The quantity, 223 grams, of the condensate thus obtained was reacted with 175 grams of sodium aluminate in 300 ccs. of dioxane and 20 ccs. of water, at 96° C. for three hours. The latter reaction mixture was treated in the manner described in Example VII above. The liquid product, 167 grams, separated from said reaction mixture, had an epoxide equivalent of 154 and an average molecular weight of 421, corresponding to an average of 2.7 epoxide groups per molecule. The liquid product was also charac-

Example XXII

A mixture of ethylene glycol (124 grams, 2 mols), powered nitration grade pentaerythritol (272 grams, 2 mols) and an ether solution of $BF_3$ (3 ccs.) was heated to 120° C. Epichlorhydrin was then added gradually with the temperature maintained at 120–140° C. Additional powdered pentaerythritol and additional $BF_3$ catalyst were added at intervals, until a total of 952 grams (7 mols) of pentaerythritol were added during four hours, whereupon an extremely viscous liquid product was formed. The liquid product contained only a small amount of pentaerythritol. The condensate was treated in the manner described in Example I.

A quantity, 190 grams, of the aforesaid condensate was treated with 180 grams of sodium aluminate in 300 ccs. of dioxane, 15 ccs. of water, at 98° C. for three hours. The reaction mixture thus formed was treated in the manner described in Example I above, and a liquid product, 139 grams, was separated therefrom. The liquid product had an epoxide equivalent of 150 and an average molecular weight of 340 representing an average of 2.3 epoxide groups per molecule. The product contained 9.0% chlorine.

Example XXIII

Epichlorhydrin (1390 grams, 15 mols) was condensed with a mixture of dipentaerythritol (381 grams, 1.5 mols) and trimethylol propane (304 grams, 3 mols) at 129–153° C. for three hours, similar to the procedure described in Example I above. A portion (210 grams) of the condensate so obtained was treated with 164 grams of sodium aluminate in 300 ccs. of dioxane and 20 ccs. of water at 96° C. for three hours. The reaction mixture so formed was treated in the manner described in Example VII above. The liquid product, 140 grams, separated from the reaction mixture had an epoxide equivalent of 169 and an average molecular weight of 421, thus corresponding to an average of 2.5 epoxide groups per molecule.

Example XXIV

Epichlorhydrin (695 grams, 7.5 mols) was condensed with a mixture of triglycerol (120 grams, 0.5 mol) and pentaerythritol (148.5 grams) at 151–158° C. for 2¼ hours, as described in Example I above. The pentaerythritol used was a technical grade, described in Example XXI above. A quantity, 243 grams, of the condensate so obtained was treated with 175 grams of sodium aluminate in 300 ccs. of dioxane and 20 ccs. of water at 96° C. for three hours. The reaction procedure described in Example VII above was followed in treating the reaction mixture, from which 183 grams of a liquid product were separated. The product had an epoxide equivalent of 167 and an average molecular weight of 438 indicating an average of 2.6 epoxide groups per molecule.

Example XXV

A mixture of diglycerol (166 grams, 1.0 mol), powdered pentaerythritol (170 grams, 1.25 mols) and 7 ccs. of $BF_3$ in diethyl ether solution was heated with stirring to 118° C., ethylene oxide gas was then introduced therein until a total of 157 grams of ethylene oxide had reacted. A separate portion (3 ccs.) of the $BF_3$ solution was then added, followed by the addition of 832 grams (9 mols) of epichlorhydrin during a period of 3½ hours at 94–110° C. The quantity, 222 grams, of the condensate so obtained was treated with 155 grams of sodium aluminate in 300 ccs. of dioxane and 20 ccs. of water at 97° C. for three hours. The reaction mixture so formed was treated in the manner described in Example II above. The liquid product, 156 grams, had an epoxide equivalent of 164 and an average molecular weight of 421, corresponding to an average of 2.6 epoxide groups per molecule. The product contained 6.9 chlorine and had viscosity of K.

Example XXVI

A soyabean monoglyceride was prepared by heating 882 grams of a soyabean oil, 193 grams of glycerol and 2 grams of calcium acetate at 200–210° C. for 1½ hours. A quantity, 711 grams, of the monoglyceride so obtained was condensed with 370 grams (4 mils) of epichlorhydrin at 95–110° C. for 15 minutes, according to the procedure described in Example I above.

A quantity of the epichlorhydrin product, 360 grams, was treated with 80 grams of sodium zincate in 600 ccs. of dioxane, at 65° C. for 1¼ hours. The reaction mixture so formed was treated in the manner described in Example VII above. The liquid product, 255 grams, had an epoxide equivalent of 455 and contained 2.2% chlorine and had a viscosity of D.

Example XXVII

Glycerol phthalate was prepared by heating 444 grams of phthalic anhydride and 582 grams of glycerol at 200–220° C. for three hours, a stream of $CO_2$ being blown through the reaction mixture. The glycerol phthalate so obtained had an acid value of 3.7. A quantity, 314 grams, of this phthalate was dissolved in 600 ccs. of dioxane and condensed with 370 grams (7 mols) of epichlorhydrin at 95–105° C. for 15 minutes. The reaction mixture so formed was treated in the manner described in Example I above.

A quantity, 342 grams, of the condensate so formed was treated with 120 grams of sodium zincate in 200 ccs. of dioxane, at 65–70° C. for 2¼ hours. The reaction mixture was treated as described in Example VII above. The liquid product, 345 grams, had an epoxide equivalent of 312 and contained 2.3% chlorine.

USES

The epoxide products obtained by the process contemplated herein have many uses and applications. As is well known to those familiar with the art, epoxides are reactive with many types of chemical compounds and, as a result, are useful as intermediates. For example, epoxides may be reacted with acids, alcohols, amines, amides, mercaptans, phenols to form a variety of useful products, among which are plastics, plasticizing agents, resins, detergents, emulsifying agents, dyes, pharmaceuticals, insecticides, etc. In addition, the halogen-containing epoxides prepared from the above-described complex halohydrins may also be reacted through their halogen atom or atoms, whereupon said halogen is replaced by another atom or group.

One particularly advantageous use of certain of the epoxides and epoxide compositions of this invention is as a brush cement, especially as a paint brush cement; this forms the subject matter of copending application of Carl E. Bixler, Serial No. 754,079, filed June 11, 1947, which issued as Patent No. 2,512,996 on June 27, 1950. Still another use of the epoxide products is as a stabilizer for halogen-containing synthetic resins and elastomers, which tend to evolve hydrochloric acid; typical of such resins and elastomers are polyvinyl chloride, polyvinlidene chloride and neoprene. The epoxide products may also be used as coatings for metals, as wire coatings, and as casting or potting materials. They may also be used as intermediates for preparing addition agents for petroleum fractions, such as lubricating oils.

Further applications for the epoxide products described hereinabove are described in applications Serial Nos.: 653,154, 653,156, filed March 8, 1946, and now issued as Patent No. 2,510,886 on June 6, 1950, and Patent No. 2,521,912 on September 12, 1950, respectively, and 653,165, filed March 8, 1946, now abandoned; 661,059 and 661,060, filed April 10, 1946, now issued as Patent Nos. 2,528,359 and 2,528,360, respectively, on October 31, 1950; 681,595, filed July 5, 1946; and 707,991, filed November 5, 1946, and issued as Patent No. 2,502,145 on March 28, 1950, and 707,992, filed November 5, 1946.

It is to be understood that the typical examples presented hereinabove illustrate the invention and are not to be construed as limitations thereof. Rather, the invention is to be construed in the light of the language of the appended claims.

I claim:

1. The process for the preparation of polyepoxides which are polyglycide ethers of polyhydric alcohols which comprises reacting in a substantially non-aqueous medium a complex polychlorhydrin ether of a polyhydric alcohol with a basic reacting composition selected from the group consisting of an alkali metal aluminate, an alkali metal silicate and an alkali metal zincate.

2. The process for the preparation of polyepoxides which are polyglycide ethers of polyhydric alcohols which comprises reacting in a substantially non-aqueous medium a polychlorhydrin ether of a polyhydric alcohol having at least three hydroxyl groups with a basic reacting composition selected from the group consisting of an alkali metal aluminate, an alkali metal silicate and an alkali metal zincate.

3. The process for the preparation of a chlorine-containing polyepoxide containing a plurality of glycide ether groups which comprise reacting in a substantially non-aqueous medium a polychlorhydrin ether derivative of glycerin with a basic reacting composition selected from the group consisting of an alkali metal aluminate, an alkali metal silicate and an alkali metal zincate.

4. The process for the preparation of halogen-containing polyepoxides which are polyglycide ethers of polyhydric alcohols which comprises reacting in a substantially non-aqueous medium a polychlorhydrin ether of a polyhydric alcohol having at least three hydroxyl groups and in which said chlorhydrin groups are in part present as chlorhydrin ethers of chlorhydrin ethers of said alcohol with a basic reacting composition selected from the group consisting of an alkali metal aluminate, an alkali metal silicate and an alkali metal zincate.

JOHN D. ZECH.

REFERENCES CITED

The following references are of record in the file of this patent:

UNITED STATES PATENTS

| Number | Name | Date |
|---|---|---|
| 2,061,377 | Groll et al. | Nov. 17, 1936 |
| 2,070,990 | Groll et al. | Feb. 16, 1937 |
| 2,413,871 | Hepp | Jan. 7, 1947 |

FOREIGN PATENTS

| Number | Country | Date |
|---|---|---|
| 554,125 | Great Britain | June 22, 1943 |

OTHER REFERENCES

Rosof and Schorlemer: "Treatise on Chemistry," vol. II, page 712, MacMillan and Co., London (1907).

Treadwell et al.: "Analytical Chemistry," page 442, John Wiley and Sons, Inc., New York, 1921.